Nov. 11, 1958
P. J. KIRKMAN
SCRIBING DEVICE
2,859,524
Filed Nov. 23, 1953
3 Sheets-Sheet 1
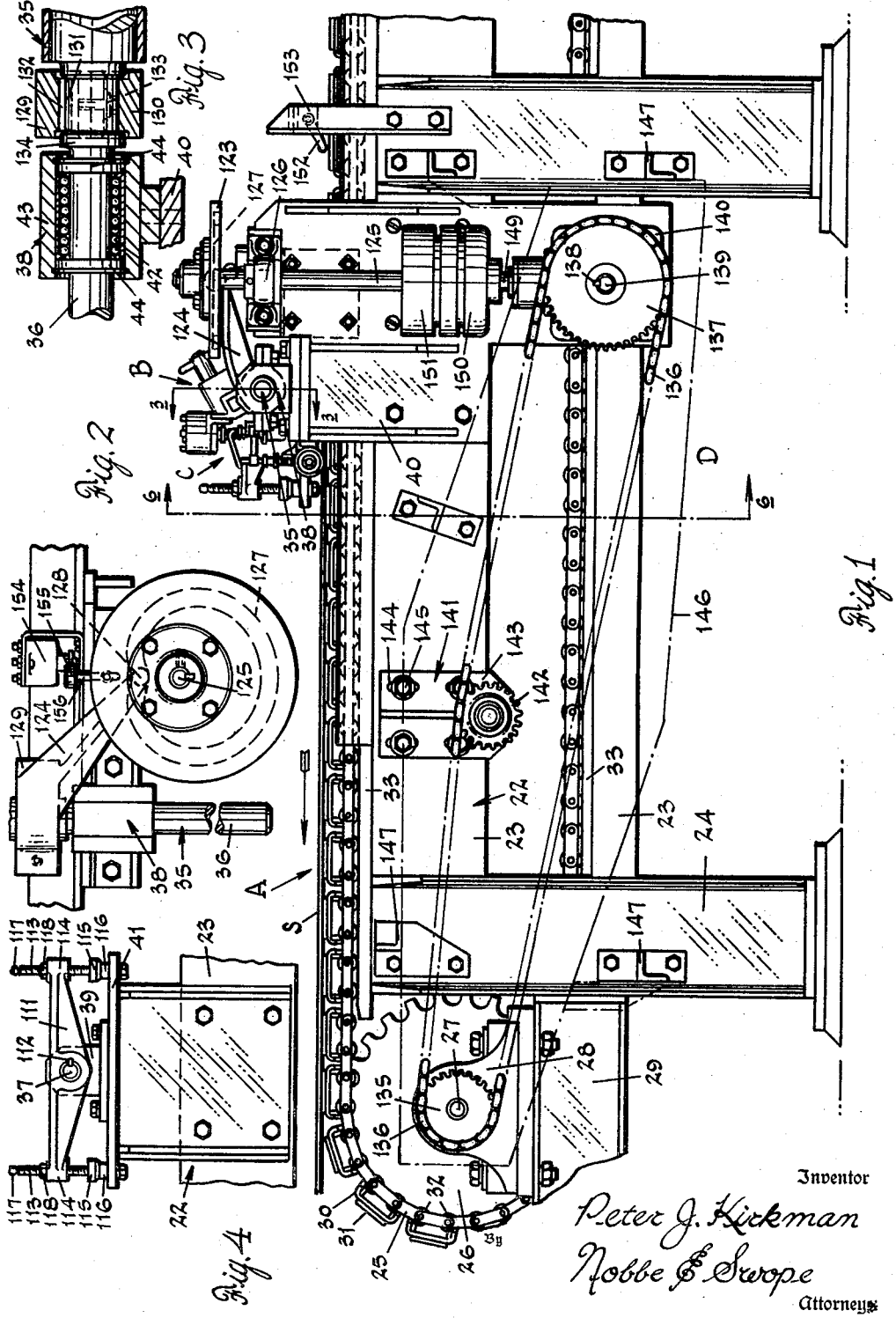
Inventor
Peter J. Kirkman
Nobbe & Swope
Attorneys

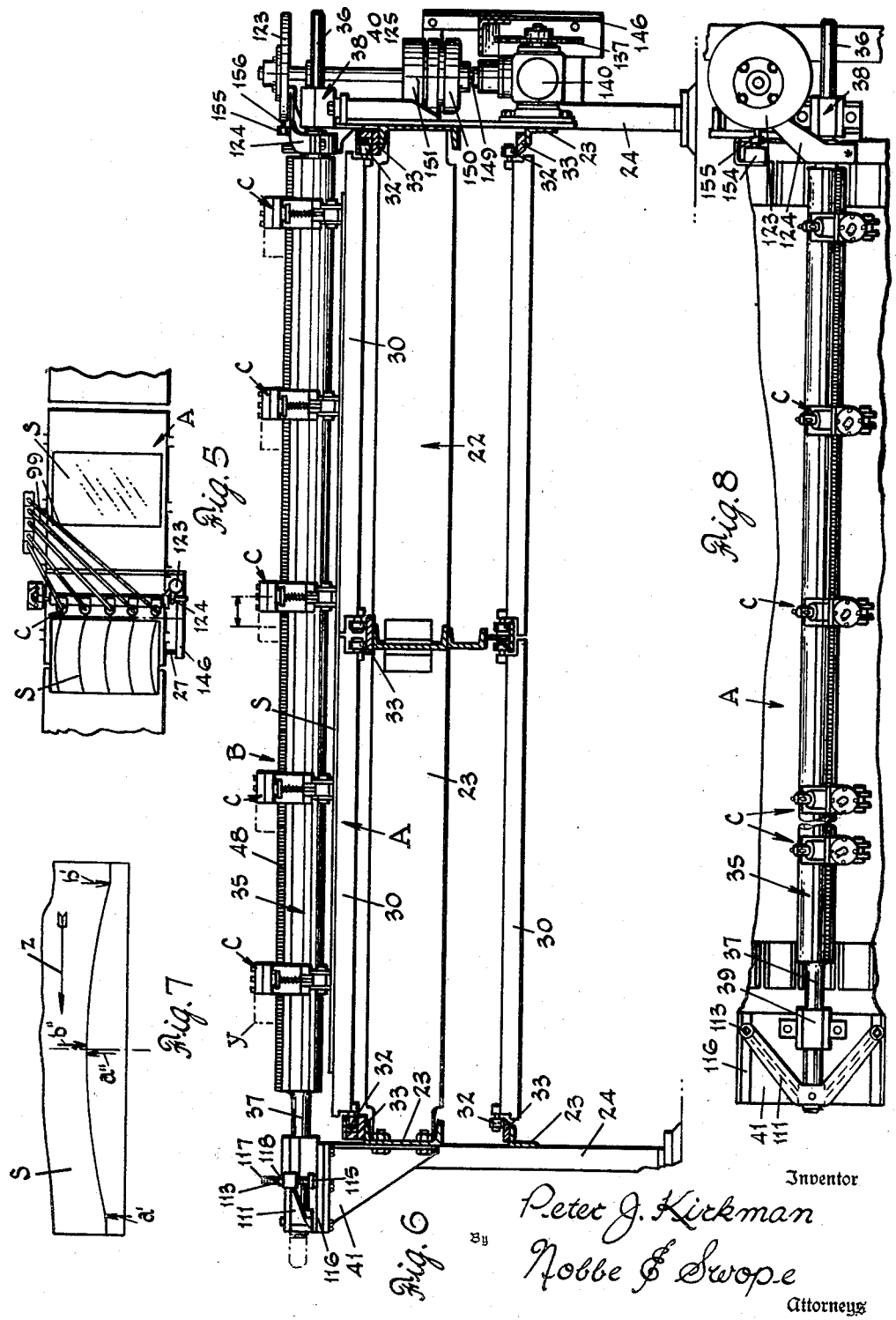

Nov. 11, 1958  P. J. KIRKMAN  2,859,524
SCRIBING DEVICE
Filed Nov. 23, 1953 3 Sheets-Sheet 3
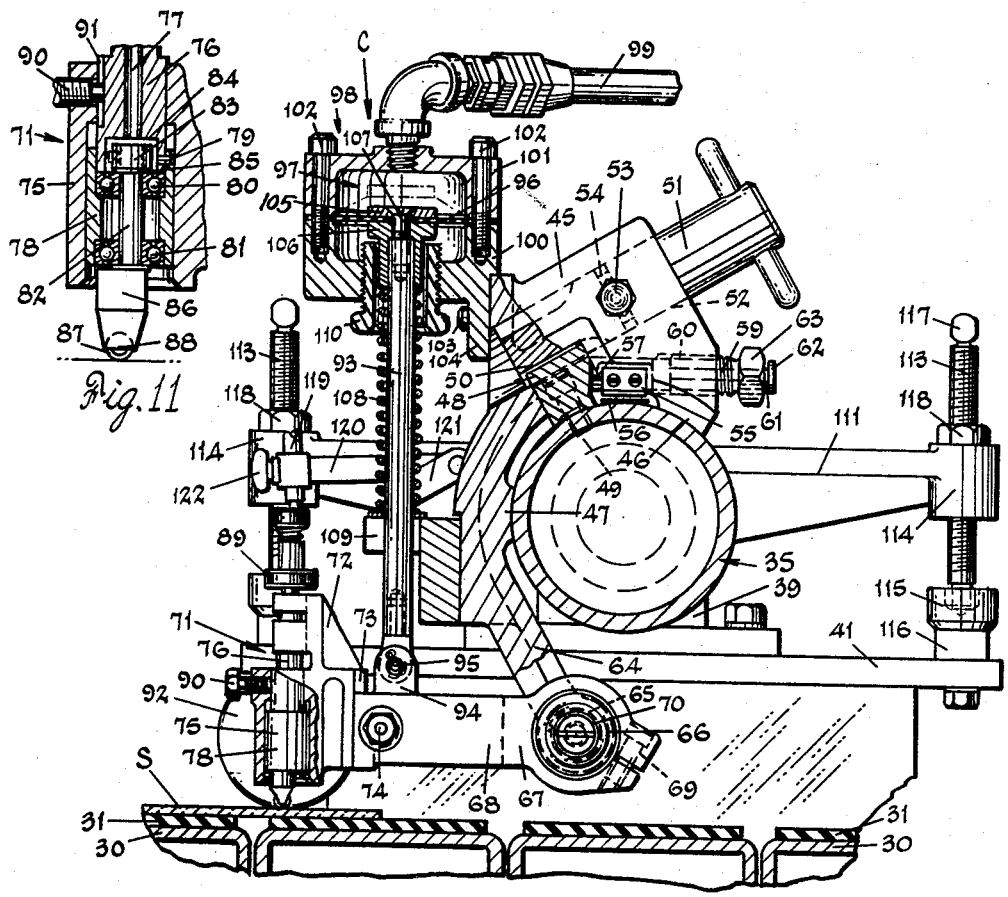
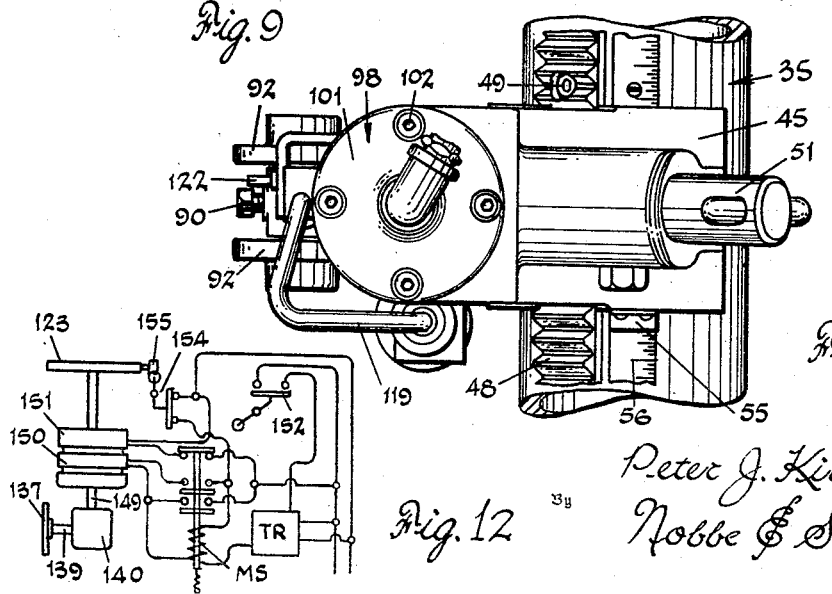
Inventor
Peter J. Kirkman
Nobbe & Swope
Attorneys United States Patent Office 2,859,524
Patented Nov. 11, 1958

2,859,524

SCRIBING DEVICE

Peter J. Kirkman, Ottawa, Ill., assignor to Libbey-Owens-Ford Glass Company, Toledo, Ohio, a corporation of Ohio Application November 23, 1953, Serial No. 393,568

4 Claims. (Cl. 33—27)

The present invention relates broadly to the scribing or marking of surfaces, and more particularly to a method and apparatus for scoring glass sheets along a curved line while the sheets are in motion.

Heretofore, the cutting or scoring of glass sheets along curved lines has been generally considered to be a special, highly skilled, and more or less hand operation, in which the glass to be cut was usually mounted and held in fixed position on a special cutting table while the cutting tool was guided over the surface to be scored by means of a pattern or template.

According to this invention, however, the cutting of glass sheets or plates along curved lines can be made a regular production line operation, and a whole series of curved score lines of predetermined contour can be scribed on the surface of a glass plate to be cut while the plate is moving along any conventional conveyor during transfer from point to point in the regular processing procedure.

Although the invention is not limited to any particular use, it has already demonstrated its commercial value in connection with the manufacture of automobile windshields by making it possible to cut block sizes of curved outline from a sheet or plate of glass as the plate moves along a production line.

Prior to this, it has been customary to cut huge plate glass blanks, after they have been ground and polished, into so-called block sizes. These block size sheets or plates were always rectangular in shape, and normally dimensioned in even inches. In cutting glass for windshields it was of course usual to choose a block size of the smallest dimension that would produce a windshield of the desired size and shape and to then pattern cut the windshield glass from the approximate center of the block size. Even then, however, because present day windshields always have a rather deeply curved top and bottom to fit the contour of the car, a great deal of glass was wasted especially in the vicinity of the two upper corners and the lower middle of the plate.

Now, however, this invention makes it possible to cut block sizes with curved sides which follow the general contour of the article that is to be cut from the block sizes, and so effects a considerable saving in material that is immediate and direct, as well as a lesser and indirect saving in time, labor and space. Specifically, the fact that glass sheets, or plate glass blanks, can be cut along a contour that conforms generally to a desired finished pattern cut, instead of along a straight line, while moving over the cutting table enables the scored, block size windshields to nestle close to each other so that a maximum number can be cut from a blank of given size and with a minimum of glass waste.

It is therefore the primary object of the invention to provide a method and apparatus for accurately scoring or marking curved lines on surfaces that are moving along definite predetermined paths.

Another object is the provision of a method and apparatus for moving a marking or scoring tool along a straight line in one direction on and over a surface moving in a straight line in a different direction in a manner to cause the relative movement between the tool and the surface to produce a curved mark or score on said surface.

Still another object is to provide a method and apparatus for simultaneously scoring a glass sheet along a plurality of curved lines during movement of said sheet along a straight path.

Further objects and advantages of the invention will become more apparent during the course of the following description when taken in connection with the accompanying drawings.

In the drawings, wherein like numerals are employed to designate like parts throughout the same:

Fig. 1 is a side elevation of an improved cutting table with cutting units mounted thereon in accordance with this invention;

Fig. 2 is a top plan view of the cutter bar actuating cam;

Fig. 3 is a fragmentary, vertical, sectional view of the cutter bar mounting taken substantially along line 3—3 of Fig. 1;

Fig. 4 is an end view of the cutter bar mounting on the end opposite that of the mounting shown in Figs. 2 and 3;

Fig. 5 is a partial top plan view of the cutting table, showing sheets of material passing beneath the scribing tools;

Fig. 6 is a sectional view taken substantially along the line 6—6 of Fig. 1, and showing the positions of a plurality of scribing units mounted above the table;

Fig. 7 is a diagrammatic view of a scored sheet showing a scribe mark thereon and illustrating the direction of travel of the sheets and the relative transverse movement of the scribing tools on the sheets during the scoring operation;

Fig. 8 is a partial top plan view of the cutter bar mounting and the scribing tools shown in Fig. 6;

Fig. 9 is a vertical sectional view of a scribing tool and actuating mechanism therefor;

Fig. 10 is a top view of the scribing tool and actuating mechanism shown in Fig. 9;

Fig. 11 is a fragmentary sectional view of a pivoted scribing roller; and

Fig. 12 is an electrical diagram.

Referring now more particularly to the drawings, there has been illustrated in Fig. 1 a machine constructed in accordance with the invention and which includes a conventional type of endless conveyor A upon which a glass plate S to be cut is moved along a generally straight path, and a cutting mechanism B mounted over the conveyor and adapted to scribe or score the plate S along a series of curved lines as the sheets and the conveyor pass therebeneath.

The conveyor A includes a generally rectangular frame 22 that may be made up of channel irons 23 bolted together at their adjoining ends and to which are secured upright channel irons 24 that provide legs for the frame. Supported on this frame are a plurality of laterally spaced and aligned conveyor chains 25 that are trained about sprocket wheels 26, keyed to axles 27, and journaled in bearings 28 carried by braces 29 secured to the legs 24. Connecting the laterally spaced conveyor chains 25 are a succession of spaced channel members 30 extending therebetween and carrying sheet supporting pads 31 on their upper surfaces.

To facilitate movement of the chains 25 they may be provided with wheels 32 that are adapted to run on longitudinal plates 33 carried by the channel irons 23.

When the conveyor is rotated by means of the sprocket drive wheels 26, the wheels 32 of the conveyor roll along the plates 33 so as to give smooth, substantially frictionless support to the support pads and the sheets thereon.

As indicated above, a cutting mechanism B is mounted over and above the conveyor A, and includes a series of individual cutting units C mounted on a cylindrical type cutter bar or support rod 35. The cutter bar 35 has stub end portions 36 and 37, reduced in diameter which are slidably and rotatably supported in bearings 38 and 39 carried on the frame 22. The bearing 38 is supported on a ledge of a support plate 40 attached to the side of the frame while the bearing 39 is secured to a plate 41 extending from the opposite side of the frame.

Each of the bearings 38 and 39, as will be seen in Fig. 3, is of a well known type composed of ball bearings 42, retained in a bearing block 43 by retainer glands 44; the bearing blocks being supported on their respective support plates 40 and 41 by bolts which securely attach them thereto.

As best seen in Figs. 9 and 10 the scribing or cutting units C positioned on the bar 35 have carriages 45 mounted in surrounding relation to the bar and are adjustable to different points along the length of the bar. To minimize the frictional contact between the carriage and the cutter bar as the carriage is moved along the bar, two small area pad surfaces 46 and 47 which are smoothly finished are provided to support the carriage on the cutter bar. Movement of each individual carriage along the bar is then made possible by means of a rack 48 mounted with set screws 49 on the face of the bar 35. A pinion 50, cut to ride in the rack 48 is carried on the lower end of a shaft 51 and is journaled in a bore 52 in the carriage. Upon turning of the shaft 51 the pinion 50 will be rotated and will mesh with the rack 48 to slide the scribing units C along the cutter bar. A set screw 53 is carried by the carriage and projects into the bore 52 so as to abut an annular groove 54 in the shaft to restrain the shaft from endwise movement in the bore.

In moving a carriage to a newly desired location, a close adjustment to the correct position can be obtained by the registration of a metering plate 55 with the marked legends of a scale 56 mounted on the cutter bar. A locking relation is then effected between the carriage and the bar by a plug 57 located in the body of the carriage and urged against the side of the rack by a hollow sleeve bolt 59 threaded into a tapped portion 60 of the carriage. The plug 57 has a shank portion 61 extending through the sleeve portion of the bolt and outwardly thereof which terminates in a head 62. To release the plug from against the rack, the bolt 59 is turned which movement causes the head 63 of the bolt to engage the head 62 of the plug and withdraw the same from contact with the rack.

Extending downwardly from the lower pad surface 47 and from the carriage is a depending leg 64 which pivotally carries by means of a pin or axle 65 and bearings 66 a support arm 68 having slotted bifurcated portions 67. The slotted bifurcated portions 67 of the arm encircle the bearings and are frictionally secured thereto by bolts 69 which draw together the ends of the slotted sections; the bearings are held on a reduced portion of the axle by washers 70 and allow the arm to freely pivot about the axis of the axle in a manner later to be described.

As best illustrated in Fig. 9, the other end of the support arm 68 supports a cutting or scribing tool generally designated by numeral 71. The cutter 71 has a frame 72 which is slidably mounted on one end of the arm 68 in dovetail grooves 73 which clamp the cutter in rigid position by means of an adjustment bolt and nut 74. By sliding the frame upwardly or downwardly in the dovetail grooves the positioning of the cutter may be easily adjusted for the proper depth of cut.

In particular, as best seen in Fig. 11, the mounting frame 72 includes a housing 75 having slidably mounted therein a spindle 76 with a bore 77 therethrough. A slide collar member 78 is attached to the lower end of the spindle by means of a pin 79. Carried inside the slide collar is an upper thrust bearing 80 and a lower thrust bearing 81 which bearings swivelly support a hollow mounting shaft 82; the mounting shaft has an upper stop collar or flange 83 which extends into the recess 84 of the spindle and rotatably supports the shaft on frictionless washer 85 located on the upper bearing 80.

Eccentrically connected to the lower end of the mounting shaft 82 is an inverted U-shaped axle keeper clip 86 which supports a steel cutting wheel 87 on an axle 88 spanning the distance between the open lower ends of the clip. The purpose of the eccentric mount is to allow the cutter wheel to pivot about the axis of the mounting shaft 82 so as to enable it to follow the relative path of the glass passing beneath the cutter. If the cutter wheel were not swivelly mounted, it would scrape and mar the glass as the cutter bar moved it transversely across the path of the glass passing therebeneath.

A fine adjustment for the cutter wheel is provided by the thumb screw 89 on the upper end of the spindle which is engageable with the upper portion of the frame 72. Once the proper setting has been made by turning the thumb screw, the spindle is rigidly fastened in position by setting the set screw 90 which is threaded through the housing 75 and engages the groove 91 in the spindle. In adjusting the cutter wheel for fine adjustments therein, the set screw is released and the thumb screw is turned in the proper direction to move the spindle, the collar, the bearing, and the mounting shaft with the wheel thereon to the cutting position desired.

For the purpose of protecting the edges of the sheets from being knicked and also to protect the cutter wheel 87 from undue wear, rubber lifting wheels or casters 92 of a larger diameter than the cutting wheel are journaled on both sides of the housing 75 in a conventional manner and are designed to freely rotate and travel upon the sheets.

The casters prevent an injurious impact of the cutter against edges of the glass by lifting or bodily swinging the arm 68 mounting the cutter upwardly so that the cutter engages the leading edge of the sheet with a relatively small portion of its cutting surface near the upper surface of the sheet. Also as the cutter and arm 68 move off the rear edge of the sheet after the scoring has been accomplished they are lowered by the wheels or casters 92 relatively slowly so that the trailing edge of the sheet is not damaged by the small portion of the cutter striking this edge. This action of reducing the severity of impact of the cutter on a leading edge of the sheet is provided by the fact that the lifting wheels 92 make contact with the leading edge of the sheet before the cutter wheels 87 do and then lift or raise these cutter wheels until they are just slightly below the upper surface of the glass before permitting them to engage the glass. Since the cutting wheels 87 extend slightly below the periphery of the lifting means 92 the cutting wheels will score the glass as it continues to travel therebeneath. As the cutter reaches the end of the sheet, it will drop off the trailing edge of the sheet for a distance equal to the amount that the cutting wheels extend below the lifting wheels at which point the wheels or casters 92 can then engage the trailing edge of the sheet and lower the cutters so as to prevent an injurious impact of them and the edge which could also produce chipping or cracking of the glass.

It is to be pointed out that when a sheet of glass is not traveling therebeneath, neither the cutting wheels nor the casters make actual contact with the conveyor pad surfaces, but are held slightly above the pad by stem means 93 pivotally secured by a pin 95 to ears 94 located midway along the length of the cutting arm 68 and biased upwardly by a spring 108.

The upper end of the stem is connected to a diaphragm 96 in a pressure chamber 97 through which pressure is applied to the stem and thence to the cutter so that the cutting wheel will make proper cutting contact with the sheets being cut. In particular, the pressure chamber 97 is located within a pneumatic cylinder generally designated by the numeral 98 and is connected to a source of air pressure 99. Basically, the cylinder is formed of two shells 100 and 101 secured together in sealing relation by bolts 102 and is mounted on the carriage 45 by bolts 103 extending through a flange 104 depending from the lower shell 100. The mating ends of the shells engage and clamp the periphery of the diaphragm or piston 96 to close one end of the casing and the pressure chamber 97 within the cylinder.

As mentioned hereinabove the central area of the diaphragm is attached to the stem 93 which is connected at its other end to the ears 94 on the cutter supporting arm. Specifically, the diaphragm 96 is fastened to the stem 93 by means of a clamping washer 105 and flanged stud 106 held together in clamping relation on the stem by a screw 107. The beforementioned spring 108 is then attached to the lower portion of the stud 106 and to a bifurcated bracket 109 on the carriage and biases the stem and diaphragm upwardly out of cutting position.

Now, when the pressure in the pipe is communicated to the related pressure chamber 97, the diapraghm 96, which may be formed of a rubber impregnated fabric, will be moved downwardly forcing the stem outwardly with respect to the cylinder 98. The extent of movement is then determined or controlled by a sleeve 110 threaded into the lower shell 100 and on which the flanged stud 106 rests at the limit of distending movement of the diaphragm.

During movement of the stem 93, the spring 108 will be compressed, one end thereof bearing against the stud 106 while the opposite end is supported on the bifurcated bracket 109 attached to the carriage. Movement of the stem 93, as induced by the pressure within the chamber 97 and defined by the sleeve 110, will lower the arm and steel cutter to a position in which the cutter will contact the glass surface; while, upon cessation of pressure, the spring 108 will act to raise the stem, the arm, and the cutter from the contacting or scoring position. Thus, it will be seen that the steel cutter 87 will be urged into scoring contact with the glass by a pressure within the chamber which pressure may be maintained at a constant value by a pneumatic control system such as magnetic valves or the like not shown. In this manner, the cutter may also be repetitively swung to and from the glass without variance to obtain a uniform cut over all of the sheets passing therebeneath.

It will thus be apparent that the effective cutting pressure of the steel cutter may be determined by controlling the valves of a pneumatic system, and the extent of movement may be determined by the space set between the flanged stud 106 and the sleeve 110. Also, the depth of fracture may be regulated by the relative position of the cutter 87 with reference to the casters 92 which may be set by adjusting the set screw 90 and spindle 76.

A still further adjustment for the cutting units is provided by means of a rocker arm 111 secured to the end 37 of the cutter bar by key 112 which arm may be rotated to pivot the cutter bar and the series of cutting units thereon to a desired cutting position. As illustrated in Figs. 4 and 9 the rocker adjustment arm 111 has adjustment screws 113 threaded through bosses 114 on each end of the rocker arm. These adjustment screws have on their end slide bearings 115 loosely but permanently mounted and adapted to engage wear plate 116 mounted on the plate 41. Thus, by raising or lowering the screw 113 by means of the thumb heads 117 the rocket arm may be pivoted which in turn will pivot the cutter bar 35 in its bearings and also rotate the cutting units C thereon. After setting the rocker arm in the desired position lock nuts 118 on the screws 113 are then adjusted to abut against the bosses 114 and thus restrict any further movement of the adjustment screws until such time it is desired that they be moved. Now, as will be apparent in Fig. 6, when the cutter bar is reciprocated in its bearings transversely of the path of the conveyor to the phantom line position y by means later to be described, the respective slide bearings will be caused to reciprocate with the cutter bar as it moves back and forth and thus restrict the bar from rotating about its longitudinal axis.

To reduce the dulling effect of the material being cut on the cutter, and also to make a finer cut on the sheets it is desirable to provide a lubricant or cutting fluid along the line of cut. For this purpose, I have provided a cutting fluid inlet pipe 119 which is positioned over the bore 77 in the adjustment screw 89 by means of compensating links 120 and 121 and clamp 122. The links are mounted on the carriage 45 and by means of a link not shown, which engages the arm 68, are actuated to maintain the inlet pipe directly over the bore at all times regardless of the up or down position of the cutter 87 and its associated arm 68. As mentioned hereinbefore, and as best shown in Fig. 11, the adjustment screw and the mounting shaft 82 have passageways therethrough which allow the cutting fluid to flow directly to a position adjacent the leading edge of the cutter for the optimum lubricating effect.

In order to scribe or cut curved lines upon the sheets being carried by the conveyor, the cutter bar with the cutting units mounted thereon is reciprocated transversely over the conveyor so that the resultant path taken by the swivel cutters in contact with the sheets S will scribe curved lines thereon such as shown in Figs. 5 and 7. This reciprocable movement of the cutter bar and cutting units is accomplished by a cam 123 which is driven in timed relation with the conveyor and is mounted adjacent the cutter bar 35 and connected thereto by a cam follower arm 124. By this means, as the sheets S are being carried by the conveyor A at a predetermined speed, the cutting units C will be moved across the sheets S to obtain the desired cuttings pattern or configuration.

As will be seen in Figs. 1 and 2, the cam 123 is horizontally and rotatably mounted on the upper end of a vertical cam shaft 125 which is journaled near its upper end by bearing 126 secured to the mounting plate 40. The cam 123 has a cam slot 127 cut in its bottom face wherein a circular cam follower 128 of the follower arm 124 is adapted to slidably fit. As illustrated in Figs. 2 and 3, the other end of cam follower arm 124 is secured by split collars 129 and 130 to an annular groove 131 on the reduced end portion 36 of the cutter bar 35. A key 132 maintains the collars in a fixed position on the cutter bar after the bolt 133 joining the two collars has been tightened to bring the collars together around the groove. Adjacent the groove on the cutter bar 35 is a flange member 134 which restricts the slide movement of the cutter bar 35 by abutting against the bearing support block 43 which supports the cutter bar.

To automatically move the cam 123 and cam shaft 125 in timed relation with the endless conveyor A there is provided a drive arrangement designated by the letter D. Specifically, the drive mechanism consists of small sprocket drive wheel 135 mounted on one end of the main axle 27 and over which a sprocket chain 136 is carried to connect the drive sprocket to another sprocket wheel 137 held by means of a key 138 on the input shaft 139 of a differential gear box 140. Located intermediate the span of the chain is a chain tension adjustment means 141 consisting of an idler sprocket wheel 142 mounted on a slide plate 143 and slidable in a vertical direction by means of slots 144 in the plate which are engaged by bolts 145 attached to the frame member 23. Thus by adjusting the slide plate in a vertical direction, the tension on the sprocket chain 136 may be properly regulated so as to allow the chain to make the proper contact with the sprocket wheels 135 and 137. A guard 146, shown in phantom lines in Fig. 1, surrounds the chain drive mechanism and is attached to the frame of the conveyor table by angle iron guide plates 147 which allow the guard to be removed for any necessary repairs or maintenance to the drive mechanism.

The variable differential gear box referred to above is mounted on the support plate 40 and is of a conventional type which effects a change in speed and power between the input shaft 139, on which the sprocket wheel 137 is mounted, and an output shaft 149 by means of a shift lever not shown. Operably connected to the output shaft 149 of the gear box and also to the cam shaft 125 is an electrically actuated clutch 150 having associated therewith an electrically actuated brake 151 which surrounds the cam shaft and together with the clutch is energized through the control circuit of Fig. 12 later to be described in detail. Thus, it will be seen that power to drive the cam 123 and the cutter bar 35 is supplied to the conveyor drive by an external source not shown from where it is transmitted to the sprocket 135 through the differential drive box 140 and thence to the clutch 150 and to the cam shaft 125. It is to be pointed out, however, that while this form of drive is preferred that other types of drive mechanisms well known in the art might also be employed to reciprocate the bar and the cutters mounted thereon.

In the actual cutting or scoring operation, a sheet of glass or other material S is fed along conveyor A in the direction of the arrow of Fig. 1. The leading edge thereof then engages a micro gate switch 152 mounted on a post 153 attached to the upper frame member 23 of the table and ahead of the cutter bar 35 and cutting units C. Actuation of the micro switch energizes the time relay TR shown in Fig. 12, which is timed so that it will pick up relay MS to energize the clutch 150 and release the brake 151 just as the leading edge of the sheet S reaches a position under the cutters.

The engagement of the clutch then causes the shaft 125 to rotate the cam 123 causing the cutter bar 35 and cutters to make a reciprocal transverse movement over the path of the moving sheet. This transverse movement of the cutters, relative to the passing sheets, causes the cutters to follow the resultant path of the two directions and cut or traverse a curved path on the surface of the sheets such as that shown in Fig. 7. To illustrate, the cutter wheel 87 meets the oncoming sheet S along the line shown by the arrow $a'$ of Fig. 7 and, as the cutter bar 35 moves in the direction of the arrow $a'$, the bar along with cutters C will be moved along the sheet in the direction of and to the extent of the arrow $a''$ during a half revolution of the cam. At the beginning of the last half revolution of the cam, the cutter and bar are initially at their outward limit of their movement equivalent to position $a''$ but beginning their return movement in the direction of the arrow $b''$. Upon the completion of an entire revolution of the cam, the cam will have moved the cutter back to its original position but, as the sheet S had been moving continually in the direction of the arrow $z$ the cutter position on the sheet will be that shown by the arrow $b'$ on the trailing end of the sheet. The arrow $b'$ it is to be pointed out designates the direction of movement and the location of the cutter just previous to the stopping of the cam and the reciprocal movement of the bar 35.

After making one complete revolution causing the bar to complete one reciprocal cycle, the cam engages a micro switch 154 mounted in the frame 23 adjacent the cam by means of a button 155 projecting radially from the side of the cam on a stud 156. This interrupts the clutch holding circuit through MS and deenergizes the clutch 150. Upon deenergization of the clutch, the brake 151 is then energized to stop the cam 123 and any further travel of the bar 35 and cutters C until the micro gate switch 152 is again actuated by another oncoming sheet to repeat the timing cycle through TR.

It is to be noted that while for simplicity in presentation only the scoring of a uniform curve has been shown in the drawings, the device may also be used to score irregular lines as well as straight lines on sheeted material. These patterns could be easily attained by the appropriate design of the cam 123 to suit the intended purpose. Further changes in the design may also be brought about by changing the cam drive speeds by means of the variable gear box 140 or by utilizing indexing drive mechanisms well known in the arts.

It is also to be understood that the form of the invention disclosed herein is to be taken as the preferred embodiment thereof, and that various changes in the shape, size and arrangement of parts may be resorted to without departing from the spirit of the invention or the scope of the following claims.

I claim:

1. In a device for cutting arcuate shaped portions from flat sheeted material, a conveyor for moving said sheets, a reciprocating cutter bar mounted transversely above said conveyor, a plurality of cutting means adjustably mounted thereon, a cam mounted for rotary movement at one end of said cutter bar, a cam follower operably connecting said cutter bar to said cam, driving means connecting said conveyor and said cam, said driving means including a clutch and brake mechanism, and a sheet responsive actuating means for said clutch and brake to release said brake and engage said clutch to move said cutter bar and cutting means across the path of the conveyor and sheets to cut said sheets upon the entry of a sheet under said cutting means.

2. In a device for cutting arcuate shaped portions from flat sheet material, a conveyor for moving said sheets along a straight path, a reciprocating cutter bar mounted transversely above said conveyor, a plurality of cutting units including cutting tools adjustably mounted on said bar, said cutting tools being pivotally mounted and adapted to engage the sheet of glass at a point out of alignment with the axis on which the cutting tool is pivoted, means for urging said tools into cutting engagement with the upper surface of a glass sheet on said conveyor, a cam mounted for rotary movement at one end of said cutter bar, a cam follower operably connecting said cutter bar to said cam, driving means connecting said conveyor and said cam, said driving means including a clutch and brake mechanism, and a sheet responsive actuating means for said clutch and brake to release said brake and engage said clutch to move said cutter bar and cutting means across the path of the conveyor and sheets to cut said sheets upon the entry of a sheet under said cutting means.

3. In a device for cutting arcuate shaped portions from glass sheets, a conveyor for moving said sheets along a straight path, a reciprocating cutting bar mounted for transverse movement above said conveyor, a plurality of cutting wheels adjustably mounted on said bar for disposing said tools over a predetermined range of vertical position, said cutting tools being pivotally mounted for movement in a plane substantially perpendicular to said glass sheets and along the path of movement of said sheet, positioning wheels mounted on said cutter bar the peripheries of which are disposed slightly above said sheet while said cutting wheels are in cutting engagement with said sheet and maintained in a fixed spaced position in relation to said cutting wheels, means for urging said tools into cutting engagement with the upper surface of said glass sheet on said conveyor, a cam mounted for rotary movement, a cam follower operably connecting said cutter bar to said cam, driving means connecting said conveyor to said cam, and a sheet responsive actuating means for positively engaging said cam and said driving means so as to move said cam follower and said cutter bar carrying said cutting wheels transverse to the path of the conveyor and sheets to cut said sheets upon the entry of a sheet under said cutting wheels.

4. In a device for cutting arcuate shaped portions from flat sheet material, a conveyor for moving said sheets, a reciprocating cutter bar mounted transversely above said conveyor, a plurality of cutting means adjustably mounted thereon, means mounted for rotary movement at one end of said cutter bar, connecting means operatively connecting said means mounted for rotating movement and said cutter bar for reciprocating said cutter bar transversely of said conveyor upon rotation of said means mounted for rotary movement, driving means connecting said conveyor and said means mounted for rotary movement, said driving means including a clutch and brake mechanism, and a sheet responsive actuating means for said clutch and brake to release said brake and engage said clutch to move said cutter bar and cutting means across the path of the conveyor and sheets to cut said sheets upon the entry of a sheet under said cutting means.

References Cited in the file of this patent

UNITED STATES PATENTS

| | | |
|---|---|---|
| 439,360 | Smith | Oct. 28, 1890 |
| 1,834,143 | Callard et al. | Dec. 1, 1931 |
| 2,035,581 | Williams | Mar. 31, 1936 |
| 2,184,126 | Phillippe | Dec. 19, 1939 |
| 2,230,651 | Morris | Feb. 4, 1941 |
| 2,323,686 | Sommerfeld | July 6, 1943 |
| 2,345,104 | Dittrich | Mar. 28, 1944 |
| 2,556,757 | Guild | June 12, 1951 |

FOREIGN PATENTS

| | | |
|---|---|---|
| 456 | Great Britain | 1891 |
| 477,420 | Great Britain | Dec. 30, 1937 |